United States Patent
Mazza et al.

(10) Patent No.: US 8,251,204 B1
(45) Date of Patent: Aug. 28, 2012

(54) SYSTEM AND METHOD FOR ELECTROMAGNETIC RETENTION OF VIBRATORY FEEDER COMPONENTS

(75) Inventors: John P. Mazza, Indianapolis, IN (US); Mark F. Koester, Whiteland, IN (US); Robert A. Jennings, Indianapolis, IN (US); Bruce E. Allen, Indianapolis, IN (US); Ryan L. Jennings, New Palestine, IN (US); Jonathon Baumann, Indianapolis, IN (US)

(73) Assignee: Service Engineering Incorporated, Greenfield, IN (US)

( * ) Notice: Subject to any disclaimer, the term of this patent is extended or adjusted under 35 U.S.C. 154(b) by 151 days.

(21) Appl. No.: 12/911,220

(22) Filed: Oct. 25, 2010

(51) Int. Cl.
*B65G 27/24* (2006.01)
(52) U.S. Cl. ............... 198/769; 198/758; 198/757
(58) Field of Classification Search ............ 198/752.1, 198/756, 757, 758, 759, 769
See application file for complete search history.

(56) References Cited

U.S. PATENT DOCUMENTS

| | | | | | |
|---|---|---|---|---|---|
| 3,700,094 | A | * | 10/1972 | Parr | 198/757 |
| 4,909,379 | A | * | 3/1990 | Albeck et al. | 198/769 |
| 5,042,643 | A | * | 8/1991 | Akama | 198/753 |
| 5,287,027 | A | * | 2/1994 | Marshall et al. | 198/769 |
| 5,462,155 | A | * | 10/1995 | Demar et al. | 198/752.1 |
| 5,611,423 | A | | 3/1997 | Graham | |
| 5,664,664 | A | * | 9/1997 | Gaines | 198/769 |
| 5,813,517 | A | | 9/1998 | Logeman | |
| 5,865,297 | A | | 2/1999 | Chiba et al. | |
| 6,047,811 | A | * | 4/2000 | Zittel et al. | 198/763 |
| 6,161,679 | A | | 12/2000 | Graham | |
| 6,349,817 | B1 | * | 2/2002 | Wadensten | 198/763 |
| 6,651,807 | B2 | | 11/2003 | Baird et al. | |

* cited by examiner

*Primary Examiner* — James R Bidwell
(74) *Attorney, Agent, or Firm* — Woodard, Emhardt, Moriarty, McNett & Henry LLP (57) ABSTRACT

Disclosed is a vibratory parts feeding system having an electromagnetic securement system for operatively coupling a feeder bowl, inline feeder, and/or hopper bin to their respective base drive units. The securement system includes a metallic plate and a mounting portion, wherein the metallic plate is affixed to or integrated into the feeder bowl, inline feeder, or hopper bin and the mounting portion, which includes an electromagnet, is affixed to or integrated into the base drive unit. The metallic plate and mounting portion are designed to interface with one another, and when the electromagnet is energized, the metallic plate is secured to the base drive unit by the mounting portion.

19 Claims, 8 Drawing Sheets

SYSTEM AND METHOD FOR ELECTROMAGNETIC RETENTION OF VIBRATORY FEEDER COMPONENTS

FIELD OF THE INVENTION

The present invention relates generally to a vibratory parts feeding system and, more particularly, to a quick change electromagnetic securement system for connecting vibratory feeder components such as parts feeder bowls, inline track, and/or hopper bins to a base drive unit.

BACKGROUND

Vibratory parts feeders are commonly known systems for providing properly oriented parts from a volume of disoriented parts, for transporting parts along a processing path, and/or for feeding to and maintaining a predetermined quantity of parts in a downstream parts orienting feeder. One common requirement of any of the foregoing parts feeders in certain applications, such as the pharmaceutical industry and assembly industries involving sensitive electrical components, is that they be maintained within a sterile environment. Typically, in pharmaceutical processing, the parts feeder component which comes into contact with the parts is changed or removed several times daily for sanitary purposes and/or product changeover. This feeder component, such as a feeder bowl, inline track or hopper bin, is typically secured to its vibratory base drive by bolts or similar removable attachment means. In this arrangement, tools such as wrenches must be used both to remove the feeder component from the base drive unit and to re-install a replacement component. Since the feeder component is almost always removed during normal operation of a feeding system, the removal and subsequent re-attachment of a feeder component must be done as quickly as possible as even minor downtime of the associated production line is particularly costly.

On the average, the amount of time required to perform such a changeover of the feeder bowl in a sterile environment is on the order of twenty minutes. Further, the tools that are used to attach and re-attach the feeder bowl to the base drive require sterilization before each use. In effect, the current system for product changeovers and sterilization of part contacting surfaces is time-consuming and inefficient as it can require that a manufacturing line be shut-down for longer than desired.

Previous attempts to solve this change-over problem have used a vacuum to secure the bowl to the drive unit, however, these systems suffer from the inherent problem that they require fragile seals and the maintenance of smooth engagement surfaces between the bowl and the drive unit. Thus, there remains a need for a new and improved vibratory parts feeding system which does not require a long changeover time or tools for performing the changeover while, at the same time, provides reliable securement without the need for fragile and easily damaged seals.

SUMMARY

The present disclosure includes certain embodiments for vibratory parts feeding systems, and more particularly for systems for securing their various components to one another. Common vibratory parts systems include a parts handling component, such as a feeder bowl, hopper, or inline track, and a base drive unit for imparting the desired vibration to the parts handling component. In certain embodiments of the present invention, an electromagnetic securement system replaces typical securement means to provide the required connection between the parts handling component and the base drive unit. In one form, a metallic mounting plate is securely attached to the base of the parts handling component which is mated to a surface on the base drive unit and held in place by a magnetic force provided by an electromagnet mounted within or on top of the base drive unit.

A preferred embodiment of the present disclosure comprises a feeder bowl mounted to a base drive unit by an electromagnetic securement system including a metallic mounting plate mounted to the feeder bowl and a selectively energized electromagnet which is arranged to provide a downward force to the mounting plate of the feeder bowl, which secures it to the base drive unit such that the vibrations of the base drive unit are imparted upon the feeder bowl.

Yet another preferred embodiment of the present disclosure comprises a vibratory parts feeding hopper mounted to a base drive unit by an electromagnetic securement system including a metallic mounting plate mounted to the hopper and a selectively energized electromagnet which is arranged to provide a downward force to the mounting plate of the hopper, which secures it to the base drive unit such that the vibrations of the base drive unit are imparted upon the hopper.

Still another preferred embodiment of the present disclosure comprises an inline vibratory track mounted to a base drive unit by an electromagnetic securement system including a metallic mounting plate mounted to the inline vibratory track and an selectively energized electromagnet which is arranged to provide a downward force to the mounting plate of the feeder bowl, which secures it to the base drive unit such that the vibrations of the base drive unit are imparted upon the inline vibratory track.

Further objects, features and advantages of the present invention shall become apparent from the detailed drawings and descriptions provided herein. Each embodiment described herein is not intended to address every object described herein, and each embodiment does not include each feature described. Some or all of these features may be present in the corresponding independent or dependent claims, but should not be construed to be a limitation unless expressly recited in a particular claim.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Additionally, in the following description, like reference characters designate like or corresponding parts throughout the several views.

Figure 1:
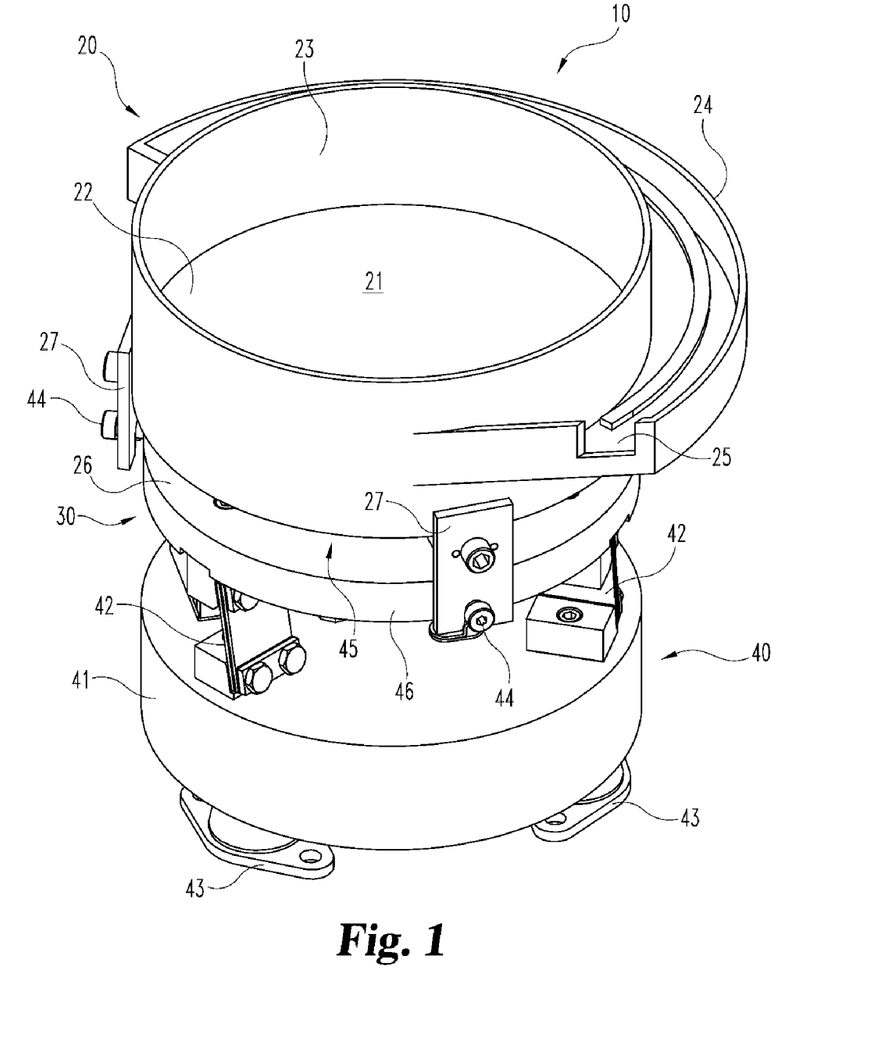
FIG. 1 is a perspective view of a feeder bowl secured to a base drive unit by an electromagnetic securement system according to one embodiment of the present invention.

A vibratory parts feeding system 10 having a electromagnetic securement system according to one form of the present invention is illustrated in its assembled form in FIG. 1. As seen in FIG. 1, the system 10 includes a feeder bowl 20 and a base drive unit 40, which are secured together using an electromagnetic securement system 30. Feeder bowl 20 is a traditional feeder bowl having a containment area 21 defined by bottom 22 and cylindrical side wall 23. Side wall 23 includes a helical track 24 extending around at least a portion of its inner and/or outer periphery which terminates at outlet 25. The track 24 along the inner portion of the containment area 21 has been omitted from FIG. 1 for purposes of clarity. The shape, size, and configuration of feeder bowl 20 may vary and the remaining components may be customized depending upon the parts to be fed and other preferences. Typical sizes for the diameter of typical feeder bowls range between about 6 inches and about 48 inches.

Figure 2:
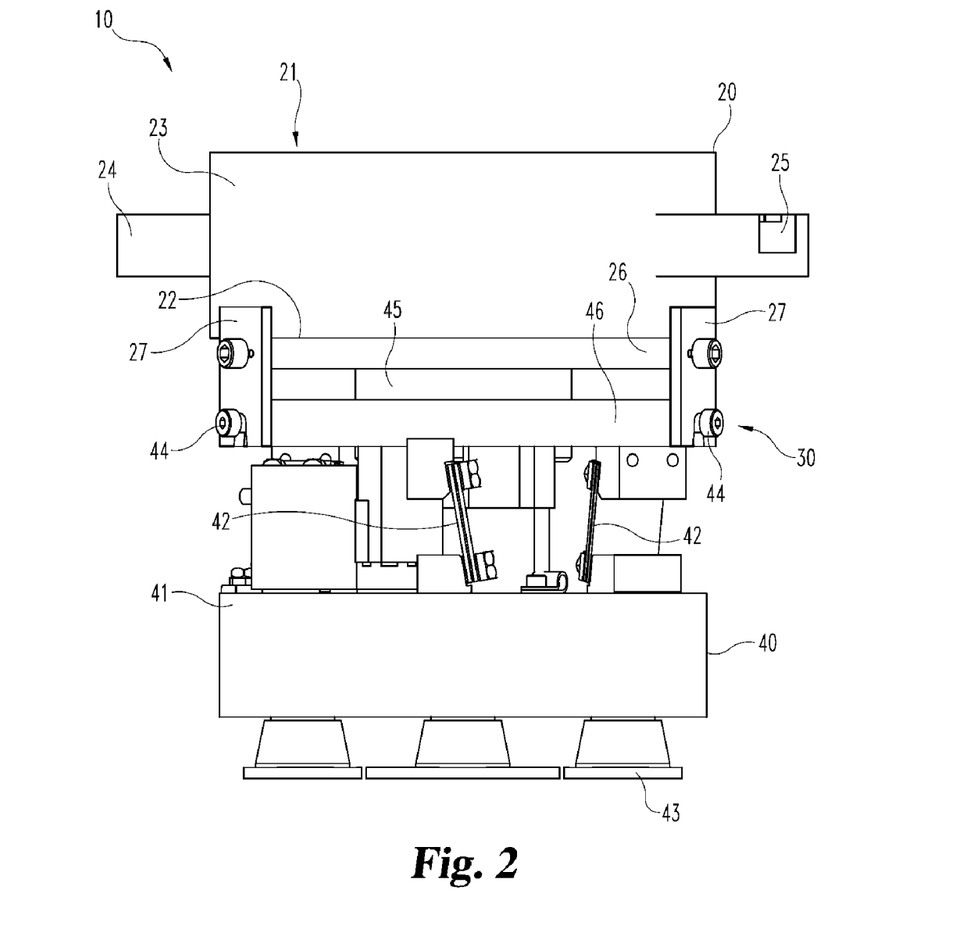
FIG. 2 is a first side view of the feeder bowl secured to a base drive unit by the electromagnetic securement system of FIG. 1.
Figure 3:
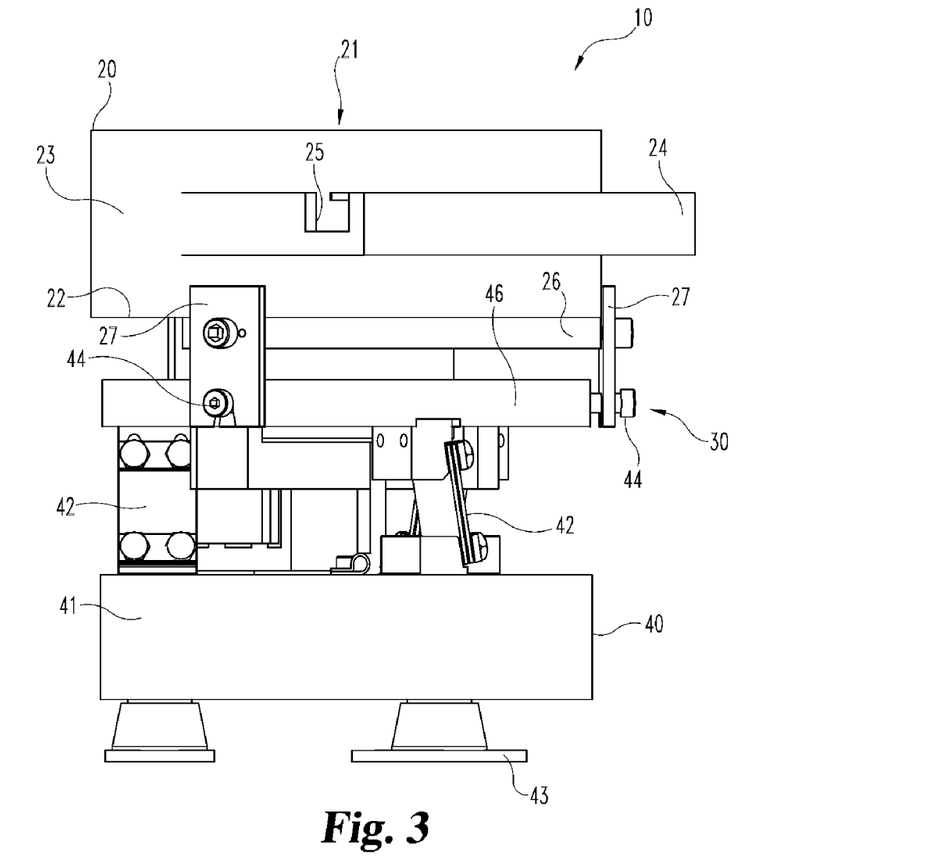
FIG. 3 is a second side view of the feeder bowl secured to a base drive unit by the electromagnetic securement system of FIGS. 1 and 2.

Turning to FIGS. 2 and 3, with continued reference to FIG. 1, base drive unit 40, in the embodiment shown, includes a vibratory motor (not shown) within an outer housing 41, a plurality of support springs 42, and a plurality of resilient feet 43. As will be appreciated by those of skill in the art, feeder bowl 20 is secured to base drive unit 40 such that the drive unit 40 is operable to urge parts upwardly along a track 24 of the feeder bowl 20 from within containment area 21 by vibrating the bowl both axially along, and rotationally about, its central axis.

In traditional vibratory parts feeding systems, the feeder bowl is attached to a mounting portion of the drive unit by a number of bolts, wherein the mounting portion and a stationary base member of the drive unit are interconnected by a plurality of drive springs. Vibratory action is created at the base member, by suitable means, which is transferred to the mounting portion via the drive springs in order to create the desired movement it contents. The vibratory parts feeding system 10 of FIGS. 1-3 accomplishes this same function, however, it also provides for the added benefit that the feeder bowl 20 may be quickly attached and removed from the base drive unit 40.

Securement system 30 includes, in the embodiment illustrated, a mounting plate 26 at the base of feeder bowl 20 which is configured to contact electromagnet 45 of drive unit 40. Mounting plate 26 may be integrated into the frame of feeder bowl 20 or may have an upper surface suitably configured for attachment to and to receive a vibratory feeder bowl, such as bowl 20. Preferably, the mounting plate 26 is sized so such that its length or width is at least 25% of the length or width of the attached vibratory component, or even more preferably, 50%, so as to provide adequate holding force.

Similarly, electromagnet 45 may be integrated into the frame of drive unit 40 or may have a lower surface suitably configured for attachment to and to receive a drive unit, such as base drive unit 40. In the embodiment illustrated, electromagnet 45 is attached to or integrated within mounting portion 46, such that when energized, it generates a magnetic force sufficient to secure mounting plate 26 toward mounting portion 46 such that the vibrations generated by drive unit 40 are communicated to feeder bowl 20. Additionally, for alignment purposes, feeder bowl 20 may include mounting tabs 27 which line up with corresponding mounting posts 44 of drive unit 40 when mounting plate 26 is in contact with and properly oriented with respect to electromagnet 45 and mounting portion 46. In one form, mounting tabs 27 and mounting posts 44 are spaced around their respective devices at irregular angular distances to provide for only a single mounting orientation.

Figure 4:
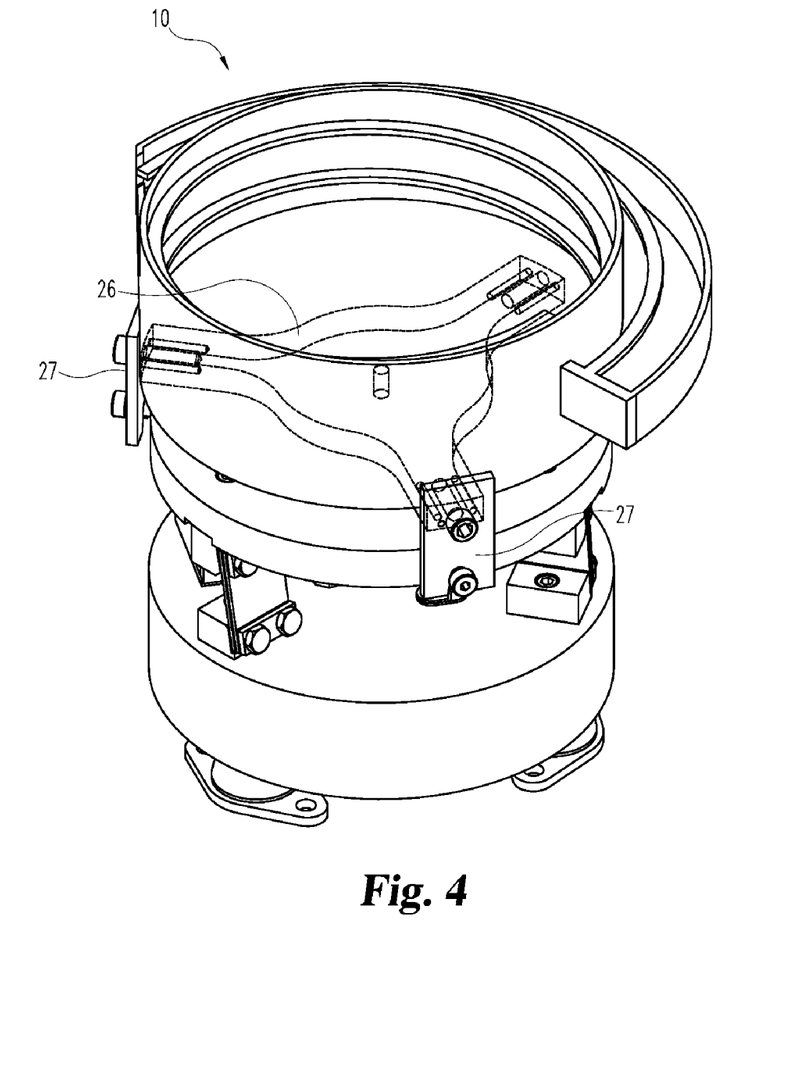
FIG. 4 is an alternate view of the feeder bowl of FIG. 1 with certain hidden components shown in broken lines.

Mounting plate 26 and electromagnet 45, as illustrated, are generally circular in shape. However, other shapes may be used depending upon the arrangement desired. Further, mounting plate 26 and mounting portion 46 may be constructed with materials which will withstand the kind of movements and vibrations typically associated with moving articles through a vibratory parts feeding system. Additionally, mounting plate 26 must be made from a material capable of being attracted by a magnet with sufficient force to couple mounting plate 26 to mounting portion 46. Preferably, mounting plate 26 is constructed principally from a ferromagnetic material, such as steel or the like. In a further preferred form, mounting plate 26 is constructed primarily from mild steel and plated with nickel or some other suitable material to provide for added corrosion resistance. Shown in FIG. 4 is another perspective view of the vibratory parts feeding system 10 of FIGS. 1-3, however, mounting plate 26, which is typically hidden, has been illustrated in broken lines. As can be seen, mounting plate 26 is secured to mounting tabs 27 and the remainder of feeder bowl 20.

In operation, as the feeder bowl 20 is lowered onto the base drive unit 40, the mounting tabs 27 and mounting posts 44 help to installer to properly position the feeder bowl 20 over the base drive unit 40 and maintain correct alignment. In this orientation, the lower face of mounting plate 26 and the upper face of electromagnet 45 are in contact with one another. When the electromagnet 45 is turned activated via its on/off controls (not shown), an electromagnetic field is generated which attracts mounting plate 26 to electromagnet 45. When this occurs, a coupling effect is achieved between the mounting plate 26 and electromagnet 45, thereby securing the feeder bowl 20 to the base drive unit 40. As a result, when the motor of base drive unit 40 is activated, the vibration generated is communicated to the feeder bowl 20 to effectuate the desired operation.

The strength of the electromagnetic field generated by electromagnet 45 to reliably achieve and maintain the desired coupling effect depends on the size of the feeder bowl 20. It has been found that an electromagnet having a holding force of 650 pounds is sufficient for typical applications, however, it shall be appreciated that an electromagnet with more or less holding force, such as 200 or 400 pounds, may be utilized depending upon the specifics of each particular application. A suitable electromagnet is the Surface-Contact DC-Powered Electromagnet (Part #5698K76) available from McMaster-Carr of Chicago Ill. and was found to be more than sufficient for use with a standard 8" feeder bowl. With this desired coupling effect, vibrations from the base drive unit 40 are transmitted to the feeder bowl 20. As a result, the contained parts are moved from the bottom of feeder bowl 20 and along its spiral-shaped track 24 which extends around the periphery of the wall of the feeder bowl 20. The parts continue moving along track 24 and then on to the next stage in the production line via outlet 25.

To remove the feeder bowl 20, electromagnet 45 is turned off, thereby immediately eliminating the downward electromagnetic force on mounting plate 26 which secures feeder bowl 20 to base drive unit 40. The feeder bowl 20 may then be removed by simply lifting it up from the base drive unit 40. Another sterilized vibratory component or vibratory component for feeding different parts can then be placed on the base drive unit 40 and the electromagnet 45 re-energized to begin the process for firmly attaching the feeder bowl 20 to the base drive unit 40.

Figure 5:
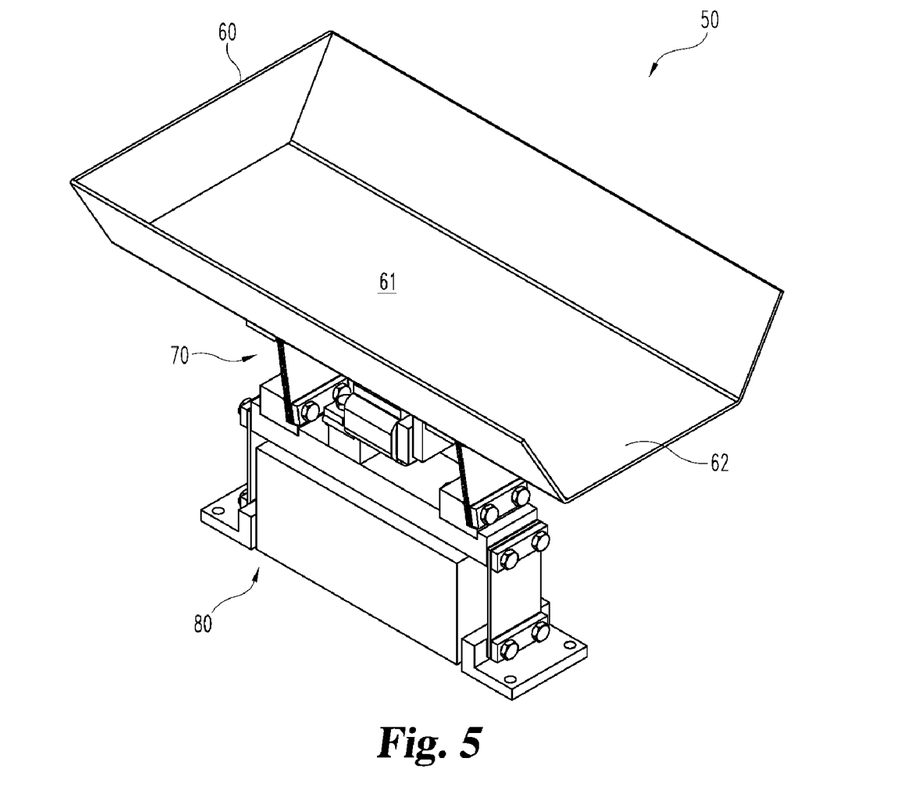
FIG. 5 is a perspective view of a vibratory hopper secured to a base drive unit by an electromagnetic securement system according to another embodiment of the present invention.

Shown in FIG. 5 is an exemplary embodiment of another vibratory parts feeding system 50 having a electromagnetic securement system according to another form of the present invention. As seen in FIG. 5, the system 50 includes a hopper 60 and a base drive unit 80, which are secured together using an electromagnetic securement system 70. Hopper 60 is a large vibratory component intended to controllably feed parts into a desired location, such as a vibratory bowl. Hopper 60, according to the illustrated embodiment, includes a storage area 61 for storing parts and an open end 62 which enables the parts to be dispensed from the storage area 61 into their desired location. The shape, size, and configuration of hopper 60 may vary depending upon the type and quantity of the parts to be fed and other preferences.

Figure 6:
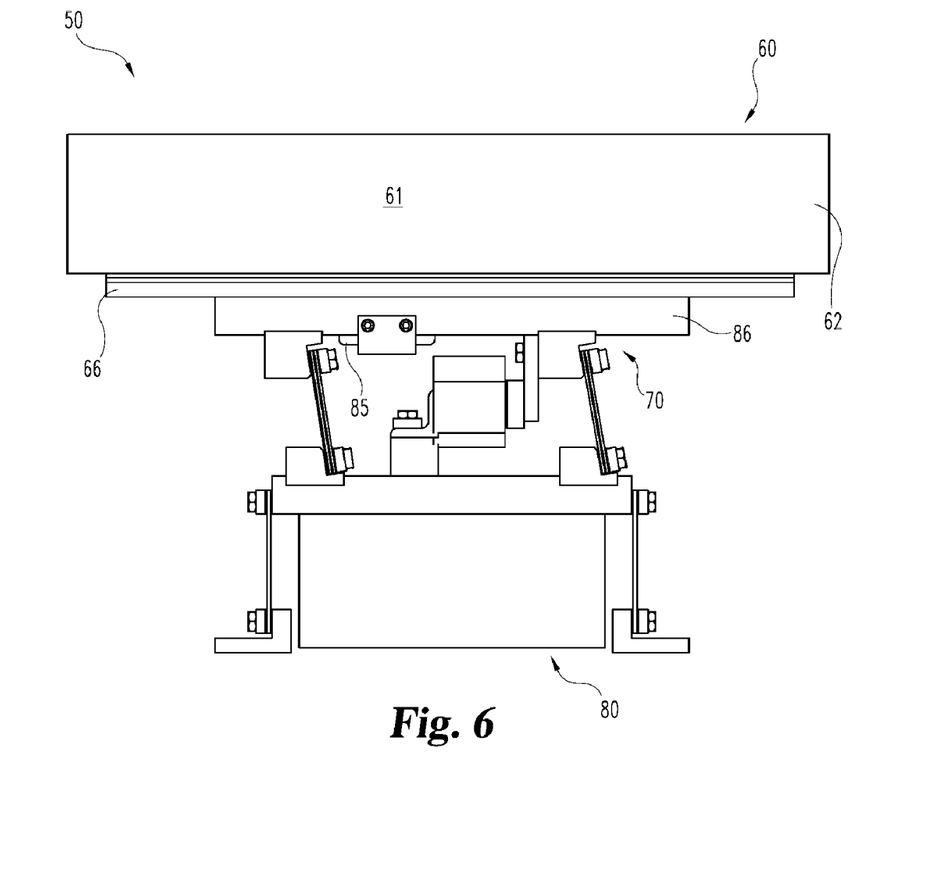
FIG. 6 is a side view of the vibratory hopper secured to a base drive unit by the electromagnetic securement system of FIG. 5.

Turning to FIG. 6, with continued reference to FIG. 5, a base drive unit 80 is provided, which is similar to the base drive unit 40 show in FIGS. 1-5. As will be appreciated by those of skill in the art, hopper 60 is secured to base drive unit 80 such that the drive unit 80 is operable to urge parts within the storage area 61 toward open end 62 by vibrating the hopper both axially along, and rotationally about, its longitudinal axis.

Securement system 70 includes, in the embodiment illustrated, a mounting plate 66 at the base of hopper 60 which is configured to contact electromagnet 85 of drive unit 80. Mounting plate 66 may be integrated into the base of hopper 60 or may have an upper surface suitably configured for attachment to and to receive a hopper, such as hopper 60. Similarly, electromagnet 85 may be integrated into the frame of drive unit 80 or may have a lower surface suitably configured for attachment to and to receive a drive unit, such as base drive unit 80. In the embodiment illustrated, electromagnet 85 is attached to or integrated within mounting portion 86, such that when energized, it generates a magnetic force sufficient to secure mounting plate 66 toward mounting portion 86 such that the vibrations generated by drive unit 80 are communicated to hopper 60.

Mounting plate 66 and electromagnet 85, as illustrated, are rectangular in shape. However, other shapes may be used depending upon the arrangement desired. Further, mounting plate 66 and electromagnet mounting portion 86 may be constructed with materials which will withstand the kind of movements and vibrations typically associated with moving articles through a vibratory parts feeding system. Additionally, mounting plate 66 must be made from a material capable of being attracted by a magnet with sufficient force to couple mounting plate 66 to mounting portion 86. Preferably, mounting plate 66 is constructed principally from a ferromagnetic material, such as steel or aluminum. In a further preferred form, mounting plate 66 is constructed primarily from mild steel and plated with nickel or some other suitable material to provide for added corrosion resistance.

When hopper 60 is being mounted to base drive unit 80, the lower face of mounting plate 66 and the upper face of electromagnet 85 are brought into contact with one another. When the electromagnet 85 is activated via its on/off controls (not shown), an electromagnetic field is generated which attracts mounting plate 66 to electromagnet 85. When this occurs, a coupling effect is achieved between the mounting plate 66 and electromagnet 85, thereby securing the hopper 60 to the base drive unit 80. As a result, when the motor of base drive unit 80 is activated, the vibration generated is communicated to the hopper 60 to effectuate the desired operation.

To remove the hopper 60, electromagnet 85 is turned off, thereby immediately eliminating the downward electromagnetic force on mounting plate 66 which secures hopper 60 to base drive unit 80. The hopper 60 may then be removed by simply lifting it up from the base drive unit 80. Another sterilized vibratory component or vibratory component for feeding different parts can then be placed on the base drive unit 80 and the electromagnet 85 re-energized to begin the process for firmly attaching the hopper 60 to the base drive unit 80.

Figure 7:
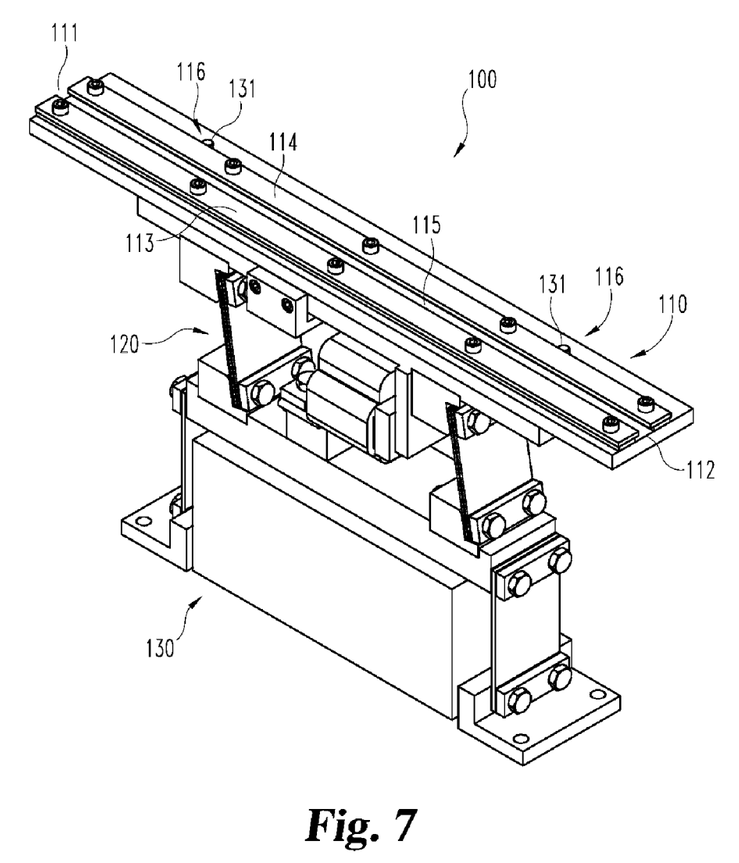
FIG. 7 is a perspective view of a inline vibratory track secured to a base drive unit by an electromagnetic securement system according to yet another embodiment of the present invention.

Shown in FIG. 7 is an exemplary embodiment of another vibratory parts feeding system 100 having a electromagnetic securement system according to another form of the present invention. As seen in FIG. 7, the system 100 includes a inline track 110 and a base drive unit 130, which are secured together using an electromagnetic securement system 120. Inline track 110 is a common vibratory component intended to receive properly oriented parts at a first end 111 and carry them to second end 112 where they may be picked up by another component or otherwise handled. Inline track 110, according to the illustrated embodiment, includes pair of guides 113 and 114 which form a hollow track 115 in which the parts ride during their transit from first end 111 to second end 112. The shape, length, size and configuration of inline track 110 may vary depending upon the type and quantity of the parts to be fed and other preferences. Additionally, inline track 110 includes recesses 116 and base drive unit 130 include corresponding dowel pins 131 which aid in aligning the two components during installation.

Figure 8:
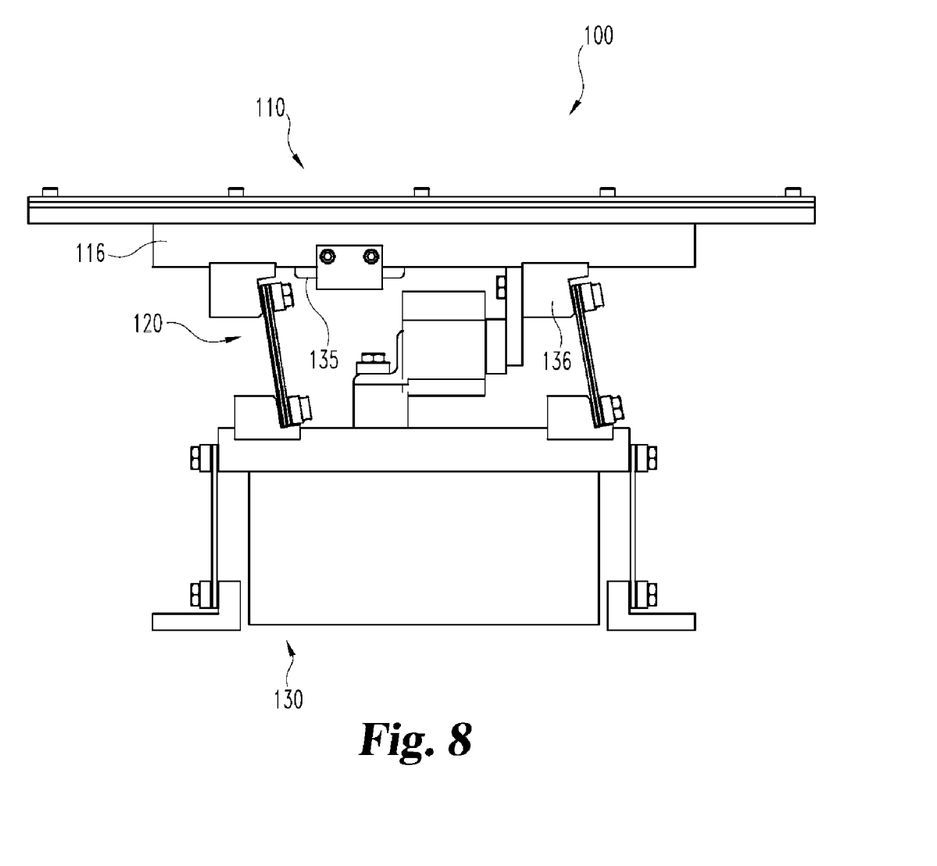
FIG. 8 is a side view of the inline vibratory track secured to a base drive unit by the electromagnetic securement system of FIG. 7.

Turning to FIG. 8, with continued reference to FIG. 7, a base drive unit 130 is provided, which is similar to the base drive unit 40 show in FIGS. 1-5. As will be appreciated by those of skill in the art, inline track 110 is secured to base drive unit 130 such that the drive unit 130 is operable to urge parts from first end 111 through track 115 to second end 112 by vibrating the hopper both axially along, and rotationally about, its longitudinal axis.

Securement system 120 includes, in the embodiment illustrated, a mounting plate 116 at the base of inline track 110 which is configured to contact electromagnet 135 of drive unit 130. Mounting plate 116 may be integrated into the frame of inline track 110 or may have an upper surface suitably configured for attachment to and to receive a hopper, such as inline track 110. Similarly, electromagnet 135 may be integrated into the frame of drive unit 130 or may have a lower surface suitably configured for attachment to and to receive a drive unit, such as base drive unit 130. In the embodiment illustrated, electromagnet 135 is attached to or integrated within mounting portion 136, such that when energized, it generates a magnetic force sufficient to secure mounting plate 116 toward mounting portion 136 such that the vibrations generated by drive unit 130 are communicated to inline track 110.

Mounting plate 116 and electromagnet 135, as illustrated, are rectangular in shape. However, other shapes may be used depending upon the arrangement desired. Further, mounting plate 116 and electromagnet mounting portion 136 may be constructed with materials which will withstand the kind of movements and vibrations typically associated with moving articles through a vibratory parts feeding system. Additionally, mounting plate 116 must be made from a material capable of being attracted by a magnet with sufficient force to couple mounting plate 116 to mounting portion 136. Preferably, mounting plate 116 is constructed principally from a ferromagnetic material, such as steel or aluminum. In a further preferred form, mounting plate 116 is constructed primarily from mild steel and plated with nickel or some other suitable material to provide for added corrosion resistance.

When inline track 110 is being mounted to base drive unit 130, the lower face of mounting plate 116 and the upper face of electromagnet 135 are brought into contact with one another. When the electromagnet 135 is activated via its on/off controls (not shown), an electromagnetic field is generated which attracts mounting plate 116 to electromagnet 135. When this occurs, a coupling effect is achieved between the mounting plate 116 and electromagnet 135, thereby securing the inline track 110 to the base drive unit 130. As a result, when the motor of base drive unit 130 is activated, the vibration generated is communicated to the inline track 110 to effectuate the desired operation.

To remove the inline track 110, electromagnet 135 is turned off, thereby immediately eliminating the downward electromagnetic force on mounting plate 116 which secures inline track 110 to base drive unit 130. The inline track 110 may then be removed by simply lifting it up from the base drive unit 130. Another sterilized vibratory component or vibratory component for feeding different parts can then be placed on the base drive unit 130 and the electromagnet 135 re-energized to begin the process for firmly attaching the inline track 110 to the base drive unit 130.

The benefits derived from the electromagnetic securement system of the present invention are evident at this stage. No bolts or wrenches are required to tighten or remove a vibratory component, no matter what the type, from the vibratory base drive. Once the vibratory component is positioned on the base drive unit, the electromagnet is turned on and the resulting electromagnetic field creates an effective coupling of the vibratory component to the base drive unit. As a further result, the vibrations from the base drive unit are transmitted to the selected vibratory component. In addition, in a further form, the base drive unit and mounting plates of the various vibratory components may be standardized such that any vibratory component is suitable to be mounted on top of any base drive unit.

In further forms, shielding may be provided within the feeder components to prevent the effects of the electromagnet from being imparted to the parts being handled. However, the use of stainless steel in the manufacture of the feeder components has been found by the applicants to provide sufficient shielding such that no adverse effects are imparted to metallic parts when handled.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the invention as described herein and/or by the following claims are desired to be protected.

What is claimed is:

1. A vibratory parts feeding system comprising:
a vibratory feeder component;
a vibratory base drive unit including a vibration generating motor; and
an electromagnetic securement system for selectively attaching said vibratory feeder component to said vibratory base drive unit, said electromagnetic securement system including: an mounting plate and a mounting portion having confronting surfaces, said mounting plate receiving said vibratory feeder component onto its upper surface and said mounting portion being configured on its lower surface to mount to said base drive; wherein said mounting plate is at least partially formed from a metallic material and said mounting portion includes a selectively energizeable electromagnet; whereby said vibratory feeder component is coupled to said base drive unit and the vibrations of said base drive generated by said motor are transmitted to said vibratory feeder component.

2. The vibratory parts feeding system of claim 1, further comprising a positioning system for aligning said vibratory feeder component with respect to said vibratory base drive unit.

3. The vibratory parts feeding system of claim 2, wherein said positioning system comprises a plurality of mounting tabs located on said vibratory feeder component and a corresponding number of posts located on said base drive unit.

4. The vibratory parts feeding system of claim 1, wherein said mounting plate is permanently attached to or integrated into said vibratory feeder component.

5. The vibratory parts feeding system of claim 1, wherein said mounting portion is permanently attached to or integrated into said base drive unit.

6. The vibratory parts feeding system of claim 1, wherein said vibratory component includes a track for feeding parts extending between a pickup and an outlet.

7. The vibratory parts feeding system of claim 1, wherein said electromagnet has a holding force of at least 200 pounds.

8. The vibratory parts feeding system of claim 7, wherein said electromagnet has a holding force of at least 400 pounds.

9. The vibratory parts feeding system of claim 8, wherein said electromagnet has a holding force of at least 650 pounds.

10. The vibratory parts feeding system of claim 1, wherein said vibratory component is selected from the group consisting of: a feeder bowl, a trough hopper, and an inline track.

11. The vibratory parts feeding system of claim 1, wherein said mounting plate is formed at least principally from a ferromagnetic material.

12. The vibratory parts feeding system of claim 11, wherein said mounting plate is at least partially nickel plated.

13. The vibratory parts feeding system of claim 12, wherein said mounting plate is nickel plated.

14. The vibratory parts feeding system of claim 1, wherein said mounting plate has a width that is at least 25% of the width of said vibratory component.

15. The vibratory parts feeding system of claim 12, wherein said mounting plate has a width that is at least 50% of the width of said vibratory component.

16. An electromagnetic securement system for attaching a vibratory feeder component to a vibratory base drive, said apparatus comprising:
a mounting plate and a mounting portion having confronting surfaces, said mounting plate being suitably adapted along its upper surface to receive said vibratory feeder component and said mounting portion being suitably adapted along its lower surface to mount to said vibratory base drive;
a selectively energizeable electromagnet positioned adjacent said mounting portion; whereby when said mounting plate and said mounting portion are in contact along their interior surfaces and said electromagnet is energized, said mounting plate is pulled toward said mounting portion, resulting in the coupling of said mounting portion and said mounting plate and said vibratory feeder component to said base drive and the transmission of the vibrations from said base drive to said vibratory feeder component.

17. The electromagnetic securement system of claim 16, further comprising a positioning system for aligning said mounting plate with respect to said mounting portion.

18. The electromagnetic securement system of claim 17, wherein said positioning system comprises a plurality of mounting tabs located on said mounting plate and a corresponding number of posts located on said mounting portion.

19. A vibratory parts feeding system comprising:
a feeder bowl having a bottom and a side wall with a spiral shaped track extending around at least a portion of the inner periphery of said cylindrical wall from a bottom to an outlet near the top of said cylindrical wall;
a vibratory base drive unit including a vibration generating motor; and
an electromagnetic securement system for selectively attaching said feeder bowl to said vibratory base drive unit, said electromagnetic securement system including: a mounting plate and a mounting portion having confronting surfaces, said mounting plate receiving said feeder bowl onto its upper surface and said mounting portion being configured on its lower surface to mount to said base drive; wherein said mounting plate is at least partially formed from a metallic material and said mounting portion includes a selectively energizeable electromagnet; whereby said feeder bowl is coupled to said base drive unit and the vibrations of said base drive generated by said motor are transmitted to said feeder bowl.

\* \* \* \* \*